United States Patent [19]

Lalesse

[11] Patent Number: 4,472,752
[45] Date of Patent: Sep. 18, 1984

[54] MAGNETIC HEAD

[75] Inventor: Herman C. Lalesse, Eindhoven, Netherlands

[73] Assignee: U. S. Philips Corporation, New York, N.Y.

[21] Appl. No.: 327,532

[22] Filed: Apr. 6, 1981

Related U.S. Application Data

[63] Continuation of Ser. No. 041,674, May 23, 1979, abandoned.

[30] Foreign Application Priority Data

May 29, 1978 [NL] Netherlands ......................... 7805801

[51] Int. Cl.³ .......................... G11B 5/27; G11B 5/43
[52] U.S. Cl. ....................................... 360/121; 360/76
[58] Field of Search ..................................... 360/76–77, 360/118–119, 121–123, 125

[56] References Cited

U.S. PATENT DOCUMENTS 4,101,937  7/1978  Jenkins ................................. 360/76

Primary Examiner—John H. Wolff
Attorney, Agent, or Firm—Joseph P. Abate

[57] ABSTRACT

A magnetic reading head includes two juxtaposed magnet cores each having a reading gap and an electric winding. The reading gaps are in alignment and each gap has a width which is at most equal to half the width of the information track to be read.

5 Claims, 2 Drawing Figures

MAGNETIC HEAD

This is a continuation of application Ser. No. 041,674, filed May 23, 1979, now abandoned.

BACKGROUND OF THE INVENTION

The invention relates to a magnetic reading head which is capable of generating a signal which is a measure of the azimuthal position of the gap of the head relative to the longitudinal axis of an information track to be read on a recording medium.

In playing back information stored in tracks on a recording medium, it is of great importance that during the playback process the correct azimuthal position of the gap of the head relative to the selected track should be maintained. An incorrect azimuthal position of the gap has for its result that the higher frequencies of the information signal are poorly reproduced. For example, a deviation of only a few minutes from the correct azimuthal position may reduce the reproduction of the high frequencies of an audio signal by some KHz. This problem occurs inter alia when the information has been recorded on the recording medium by means of an apparatus other than that with which it is played back at a later time.

An efficacious method with which a correction of the position of the head gap relative to a selected track is made possible is the subject matter of the patent application Ser. No. 041,674, now U.S. Pat. No. 4,317,144, filed simultaneously with the present patent application. This method is based on the fact that the upper half and the lower half of a selected information track are simultaneously scanned individually, the phase difference between the two scanned signals being measured. A control signal with which an electromechanical converter is controlled which corrects the azimuthal position of the head (gap) is derived from the phase difference. Since the determination of the phase difference between the two scanned signals may present difficulties due to the irregularity thereof, the time difference between two associated zero passages of the scanned signals is preferably measured.

SUMMARY OF THE INVENTION

It is the object of the invention to provide a magnetic reading head with which said method can be carried out.

For that purpose, the magnetic reading head according to the invention is characterized in that it comprises two juxtaposed magnet cores each having a reading gap and each carrying an electric winding. The reading gaps are disposed in aligned relationship and each reading gap has a width which at most equals one-half the width of the information track to be read.

For use in, for example, a stereo cassette recorder, in which the original mono track of 1.5 mm width is already divided into two tracks of each 0.6 mm width and 0.3 mm intermediate space, this means that a magnetic head is required which has two magnet cores each scanning one-half of one track and two magnet cores each scanning one-half of the other track. This means that the head must comprise four cores each covering a track of at most 0.3 mm. The construction of a head satisfying these requirements is not simple, the more so since there must also be space to accommodate the four associated electric windings.

An embodiment of the magnetic head of the invention is a stereo head which is capable of generating a signal which is a measure of its azimuthal position, the head comprising per track a short and a long magnet core, the electric winding of the long core viewed perpendicularly to the tape contact face of the head being situated below the electric winding of the short core. Stated another way, the distance of the coil of the long core from the tape running surface is greater than the distance of the coil of the short core from the tape running surface.

The construction of the above described head is facilitated in that it has been found that for a good operation of the magnetic head no stringent requirements need to be imposed upon the magnetic screening between the cores associated with the upper and lower halves of each track (high requirements are imposed however on the inter-track screening), so that it is possible to place the cores in question against each other without the interposition of a magnetic screening plate. If desired, separation means in the form of a thin layer of adhesive, lacquer or synthetic resin may be deposited on at least one of the confronting core faces.

The invention will be described in greater detail with reference to the accompanying drawing.

BRIEF DESCRIPTION OF THE DRAWING

FIG. 2 is an elevation view in partial section of the head shown in FIG. 1 taken on the line II—II.

DESCRIPTION OF THE PREFERRED EMBODIMENT

Figure 1:
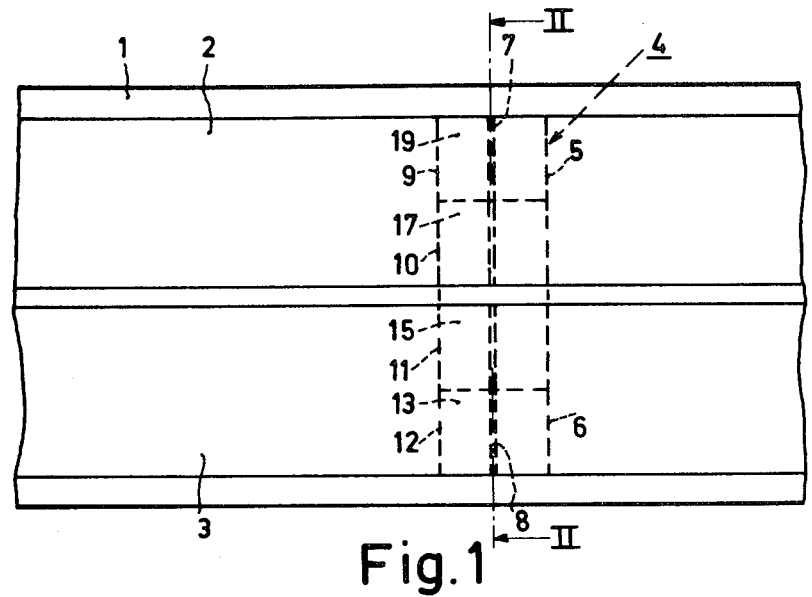
FIG. 1 is a diagrammatic plan view of a magnetic head according to the invention cooperating with a magnetic tape.
Figure 1:
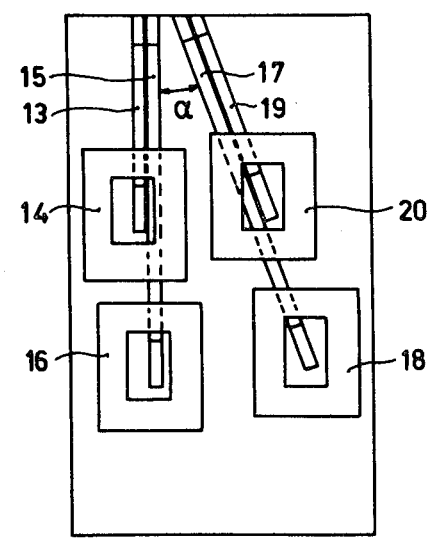

FIG. 1 shows a magnetic tape 1 which in this case has two information tracks 2 and 3 in which a stereo signal has been recorded. These tracks are scanned by means of a stereo magnetic head 4 cooperating with the magnetic tape 1. The head 4 comprises a magnet core 5 having a reading gap 7 which scans the track 2 and a magnet core 6 having a reading gap 8 which scans the track 3.

In order to be able to determine the azimuthal position of the head 4 relative to the longitudinal axis of tracks 2 and 3 from a phase relationship, the magnet cores 5 and 6 each are divided into two parts which scan the upper and lower halves 9, 10 and 11, 12, respectively of the tracks 2 and 3 individually.

FIG. 2, in which the same reference numerals are used for the same components as in FIG. 1, shows the further construction of the head 4 with reference to an elevation of the sectional view of the head shown in FIG. 1 taken on the line II—II.

A short C-shaped core part 13 carries an electric winding 14 and is placed beside a long C-shaped core part 15 which carries an electric winding 16. A long C-shaped core part 17 is positioned at an angle α with the core parts 13 and 15 and carries an electric winding 18 and is placed beside a short C-shaped core part 19 which carries an electric winding 20. In order to form complete cores which form a closed circuit for the magnetic flux except for the gap, the C-shaped core parts 13, 15, 17 and 19 may be combined with core parts which may also have the shape of a C, or the shape of an I. In view of their small width (for a stereo cassette head application a typical width is 0.25 mm), the individual core parts may each be formed from one lamination of a soft-magnetic alloy, for example, a nickel-iron alloy.

What is claimed is:

1. A magnetic head for reading information from associated first and second information tracks of an associated magnetic tape, the second information track being disposed in parallel juxtaposed relation to the first track on the associated magnetic tape, characterized in that the head comprises:

first and second juxtaposed magnetic cores each having a reading gap and each carrying an electric winding, said reading gaps being disposed in aligned relationship, each reading gap having a width which is at most equal to one-half the width of the information track to be read;

third and fourth juxtaposed magnetic cores each having a reading gap and each carrying an electric winding, said reading gaps of said third and fourth magnetic cores being disposed in aligned relationship, said first, second, third and fourth magnetic cores defining a tape contact face disposed opposite the tape during normal operation of the head, said first and third magnetic cores being shorter than respectively said second and fourth magnetic cores, said electric windings of said second and fourth cores viewed in a direction perpendicular to and towards the tape contact face of the head being disposed at a greater distance from the face respectively than said windings of said first and third magnetic cores.

2. A magnetic head as claimed in claim 1, characterized in that said first and second cores are disposed in a first plane and said third and fourth cores are disposed in a second plane, said first and second planes enclosing an angle alpha therebetween.

3. A magnetic head as claimed in claim 2, characterized in that said first and third cores are respectively parallel to said second and fourth cores.

4. A magnetic head for reading information from an associated first information track of an associated recording medium, characterized in that the head comprises first and second juxtaposed magnetic cores each having a reading gap and each carrying an electric winding, said reading gaps being disposed in aligned relationship, each reading gap having a width which is at most equal to one-half the width of the information track to be read.

5. A magnetic head as claimed in claim 4 suitable for reading stereo signals from the associated first information track and a second information track which is disposed in parallel juxtaposed relation to the first track on the associated recording medium, characterized in that the head further comprises third and fourth juxtaposed magnetic cores each having a reading gap and each carrying an electric winding, said reading gaps of said third and fourth magnetic cores being disposed in aligned relationship.

* * * * *